United States Patent [19]
Wei-Cheng

[11] 3,792,228
[45] Feb. 12, 1974

[54] ELECTRIC SOLDERING IRON

[76] Inventor: Kuo Wei-Cheng, 48 Pa-Teh Road Section 1, Taipei, China /Taiwan

[22] Filed: Sept. 20, 1972

[21] Appl. No.: 290,646

[52] U.S. Cl................ 219/230, 219/235, 219/238, 219/240, 226/127, 226/155, 228/53
[51] Int. Cl. .......................... H05b 1/00, B23k 3/06
[58] Field of Search .................... 219/221, 227–241; 228/51–55; 226/127, 153, 155, 188

[56] References Cited
UNITED STATES PATENTS

| | | | |
|---|---|---|---|
| 2,871,333 | 1/1959 | Savage............................ | 219/230 X |
| 3,257,306 | 6/1966 | Webb.............................. | 219/69 G |
| 2,590,806 | 3/1952 | Vorderstrasse ..................... | 226/155 |
| 2,901,585 | 8/1959 | Baccari et al........................ | 228/53 |
| 538,695 | 5/1895 | Osborne et al. ..................... | 228/53 |
| 3,219,251 | 11/1965 | Davis................................. | 228/53 |
| 3,390,826 | 7/1968 | Davis................................. | 228/53 |
| 1,906,225 | 5/1933 | Dupau............................ | 219/230 X |
| 2,119,462 | 5/1938 | Kull et al. ............................ | 228/53 |
| 2,432,428 | 12/1947 | Lang............................. | 219/230 UX |

FOREIGN PATENTS OR APPLICATIONS

| | | | |
|---|---|---|---|
| 618,620 | 3/1961 | Italy................................... | 219/229 |
| 668,005 | 9/1964 | Italy................................... | 219/230 |
| 529,691 | 6/1955 | Italy................................... | 219/230 |

Primary Examiner—A. Bartis
Attorney, Agent, or Firm—McGlew and Tuttle

[57] ABSTRACT

The soldering iron has a grip with a recess rotatably receiving a roll of wound wire-solder. A guide means extends from the grip toward the point of a heated soldering tip, for receiving the wire solder and guiding it toward the soldering tip. A pair of rotatable interfitting gears have facing and mating annular grooves therein through which the wire-solder passes and as the gears are rotated the solder is fed toward the soldering tip. One of the two gears may be driven by an electric motor in the grip, upon operation of a suitable switch, and the other is spring biased toward the one gear to firmly grip the wire-solder. A manual operator, in the form of a disc having a perforated periphery, is secured to the gear normally driven by the motor and this periphery extends through a slot or opening in a wall of the grip. Wire-solder can be delivered automatically or manually to the pointed head of the tip of the heater through the wire-delivery pipe by closing the motor switch or rotating the periphery of the disk with a finger tip, and the soldering can be conducted easily with one hand.

8 Claims, 9 Drawing Figures

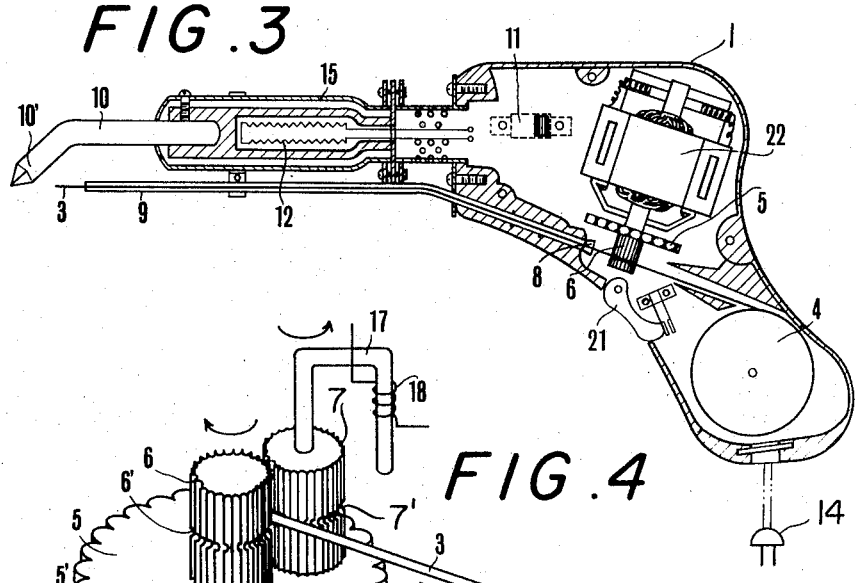
FIG. 3
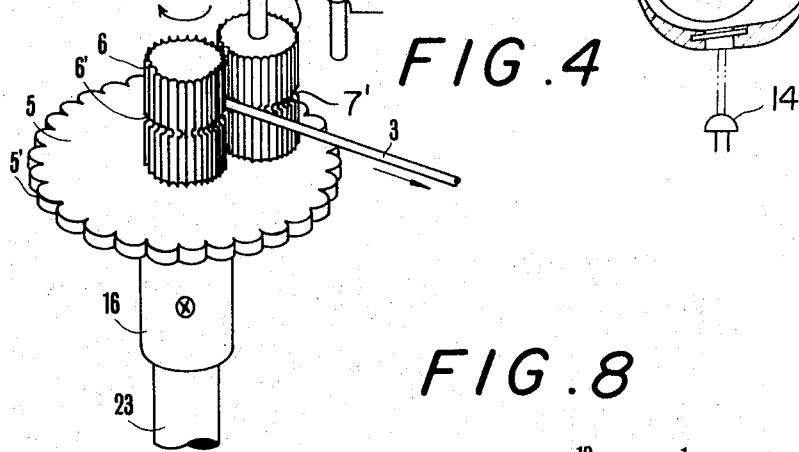
FIG. 4
FIG. 8
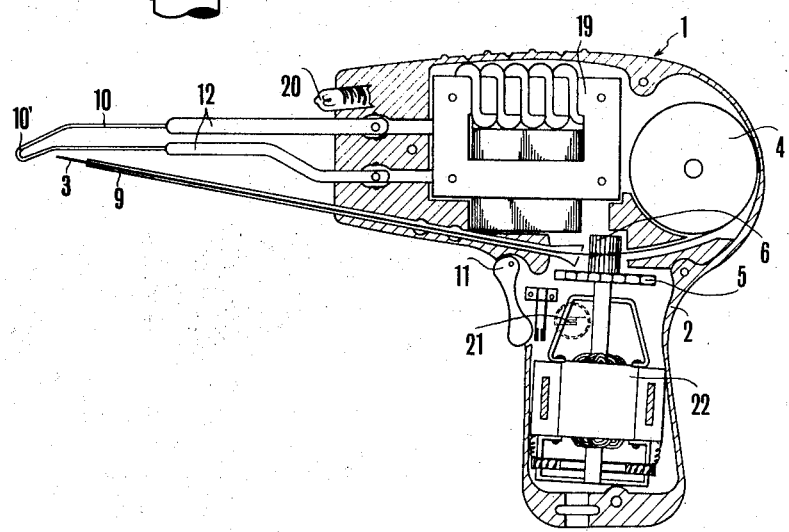

3,792,228

ELECTRIC SOLDERING IRON

FIELD AND BACKGROUND OF THE INVENTION

This invention relates to electric soldering irons and, more particularly, to an electric soldering element which may be held in one hand with the solder, in the form of wire-solder, being fed either mechanically or manually to the heated soldering tip by using a finger of the one hand to either actuate a switch or to actuate a manual operator.

Traditionally, soldering of metal products has been conducted by melting solder held by one hand with an electric soldering iron held by the other hand. Because an electric soldering iron and solder are thus separately held by the hands or solder is placed separately for use, soldering has been inconvenient and inefficient.

SUMMARY OF THE INVENTION

In the present invention, the disadvantages of an electric soldering iron mentioned above have been overcome, and the automatic and manual wire-solder delivery mechanism is provided to a conventional electric soldering iron to make soldering work simple and reduce the work time remarkably.

In accordance with the invention, the soldering iron has a hollow grip arranged to receive and rotatably support a wound roll of wire-solder. A guiding pipe or tube extends from the grip to adjacent the pointed end of the heated soldering tip. A pair of interfitting gears are arranged to feed the wire-solder and, for this purpose, the two gears have facing mating annular grooves through which the wire-solder is threaded. A first gear is driven by either an electric motor in the grip or by a disc secured to the first gear and having a knurled periphery projecting outwardly through a slot in the grip, and the second gear is spring biased into engagement with the first gear. With the soldering iron held in one hand, the wire-solder can be fed or advanced by pressing a switch with the finger of the one hand or can be manually advanced by fingertip operation of the knurled disc.

In one embodiment of the invention, a driving motor is provided in the upper portion of the hollow grip, and an electric heater support extends from the grip and serves further to support the guide for the wire-solder, the electric heater support contain-ing an electrically energized heater to which a copper soldering tip is interchangeably secured.

In a second embodiment of the invention, the electric motor is disposed in the lower end of the grip and a transformer is disposed in the upper portion of the grip, and has its output terminals connected to a loop of resistance wire or the like constituting the heated soldering tip. An indicating lamp is provided and is illuminated whenever the transformer is energized. In this second embodiment of the invention, the wire-solder guide extends forwardly and upwardly toward the pointed end or bight of the resistance wire loop.

An object of the invention is to provide an improved electric soldering iron by which soldering may be performed and solder may be fed using only one hand.

Another object of the invention is to provide such an electric soldering iron in which wire-solder may be fed to a soldering tip either mechanically or manually, using only one hand.

A further object of the invention is to provide such an electric soldering iron which is simple in construction and simple to use.

For an understanding of the principles of the invention, reference is made to the following description of typical embodiments thereof as illustrated in the accompanying drawings.

BRIEF DESCRIPTION OF THE DRAWINGS

In the Drawings:

FIG. 3 is a longitudinal sectional view through the soldering iron shown in FIG. 1;

FIG. 4 is a view illustrating the solder feeding gears;

FIG. 8 is a longitudinal sectional view through the soldering iron shown in FIG. 6.

DESCRIPTION OF THE PREFERRED EMBODIMENTS

Figure 1:
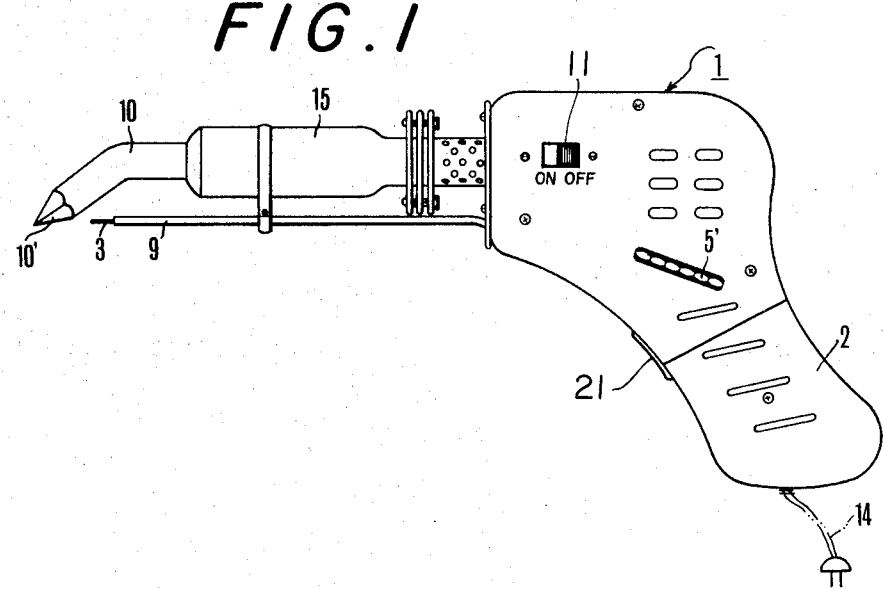
FIG. 1 is an elevation view of one form of electric soldering iron embodying the invention.
Figure 2:
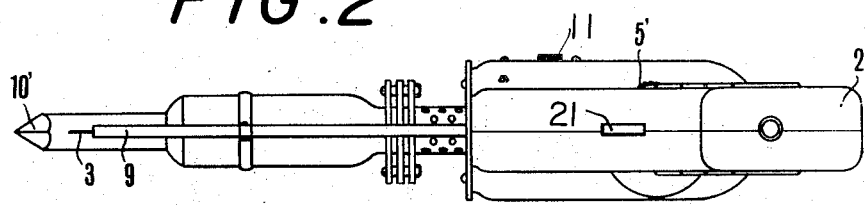
FIG. 2 is a bottom plan view of the soldering iron shown in FIG. 1.

As shown in FIG. 1 to FIG. 3, the general construction of the electric soldering iron (1) in the present invention, when the switch (11) on the upper left side of the grip (2) is closed or operated, the electric heater (12) is energized by the current passing through the cord (14) and the copper tip (10) is heated. When the motor switch (21) is closed with one finger, wire-solder (3) is automatically delivered through the wire-delivery pipe (9) fixed to the underside of the electric heater support (15), and is melted at the contact of the pointed head (10') of the heated copper tip (10).

As shown in FIG. 3, in the wire-solder delivery mechanism, the roll (4) of wire-solder (3) wound up in a coil is housed inside the grip (2) of the soldering iron (1), and the motor (22) is energized by operating the switch (21) to automatically deliver wire-solder (3) held between the toothed wheels or gears (6) (7) and the grooves (6') (7') to the pointed head (10') of the copper tip (10) through the wire-delivery pipe (9) from the entrance (8) of the wire-delivery pipe (9). As shown in FIG. 4, in the detailed construction of the toothed wheels or gears for delivery, the hollow shaft (16) and the gear (6) are fixed to the disk (5) and the hollow shaft (16) is directly connected to the shaft (23) of the motor (22) by a screw, and the gear (7) which is rotatable on the U-shaped shaft (17) is pressed by the spring (18) to engage with the gear (6). One end of the spring (18) is fixed into the grip whereby wire-solder (3) is gripped between the gears (6) (7) in the grooves (6') (7'). Moreover, wire-solder (3) can be manually delivered to the pointed head (10') of the copper tip (10) by rotating the periphery (5') of the disk (5) with a finger.

Figure 5:
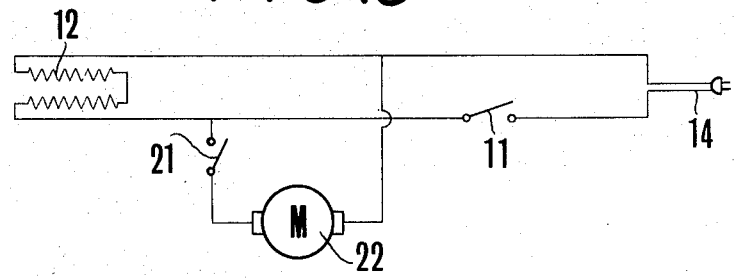
FIG. 5 is a schematic wiring diagram of the heating and motor circuit for the soldering iron shown in FIGS. 1–4.
Figure 6:
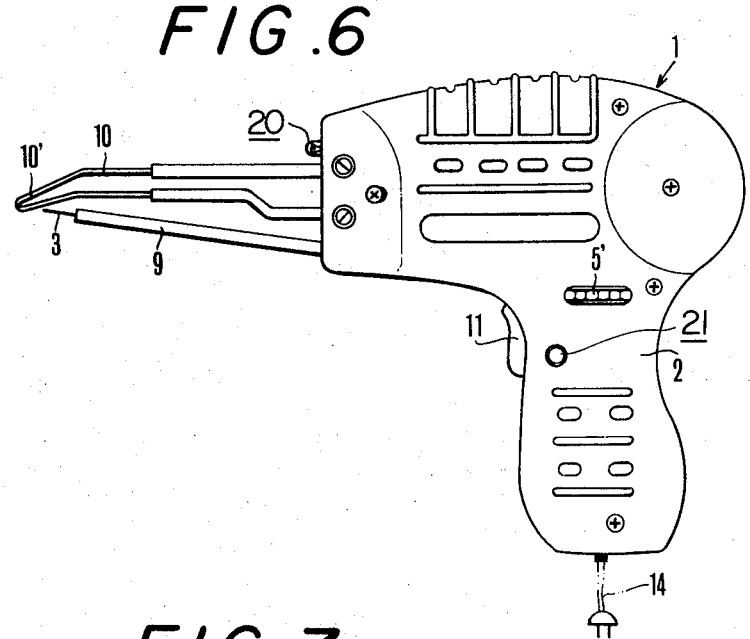
FIG. 6 is an elevation view of another form of soldering iron embodying the invention.
Figure 7:
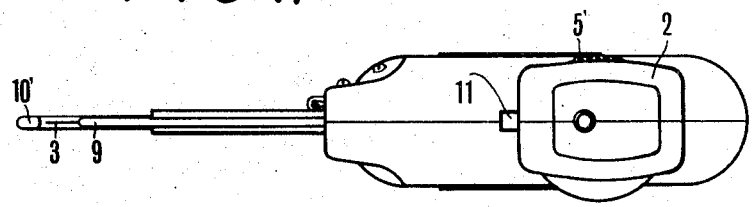
FIG. 7 is a bottom plan view of the soldering iron shown in FIG. 6.

FIG. 5 shows the electric circuit of the electric soldering iron in the present invention, in which (11) represents the switch for the power souce, (12) the electric heater, (21) the motor switch, and (22) the motor.

Figure 9:
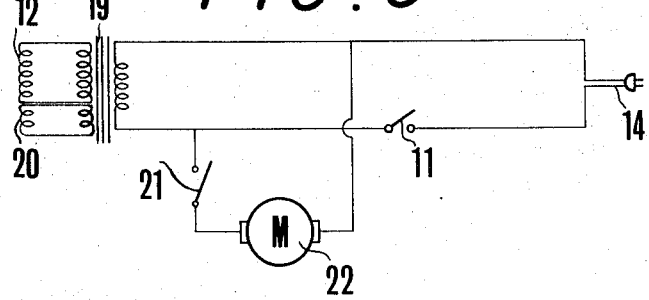
FIG. 9 is a schematic wiring diagram of the motor and heating circuit for the soldering iron shown in FIGS. 6, 7, and 8.

In the embodiment of the invention shown in FIGS. 6–9, the transformer (19) for the electric heater is employed in the heating member, and wire-solder can be delivered by means of the sloping wire-delivery pipe (9) to the pointed head(10') of the tip (10) from the underside. Moreover, an indicating lamp(20), to show the energized condition, is provided. The roll (4) of wound wire-solder(3) is provided in the upper part of the grip (2) and the motor (22) in the lower part of the grip(2). FIG.9 shows the electric circuit of this example, in which (11) represents the switch for the power souce, (12) the electric heater, (19) the transformer for the electric heater, (20) the indicating lamp, (21) the motor switch, and (22) the motor.

As described above, the electric soldering iron in the present invention has an automatic and manual wire-solder delivery mechanism by which soldering can be conducted easily by delivering wire-solder with one hand holding the electric soldering iron, and the work efficiency can remarkably be improved.

What is claimed is:

1. An electric soldering iron comprising, in combination, a hollow grip having means arranged therein for mounting therein a coil of wire-solder; a pointed soldering tip extending from said grip; electrically energized means operatively associated with said tip and operable to heat the same; wire guide means extending from said grip to adjacent the point of said tip for guiding the wire-solder from the coil to the tip an electric motor in said grip having a rotatable output shaft; a pair of rotatable interfitting gears mounted in said grip and arranged to grip wire-solder therebetween to feed the wire-solder through said guide means to the point of said tip; one of said gears being secured on a rotable support shaft coupled to the output shaft of said motor; said gears being formed with mating and facing annular recesses in their teeth intermediate the axially opposite ends of their teeth for receiving the wire-solder; a finger-operated switch in circuit with said motor for controlling energization of said motor; and a finger tip actuated manual operator means connected to said support shaft and projecting through an opening in a wall of said grip for rotating said support shaft; whereby said soldering iron may be held with one hand and a finger of the one hand may be used selectively to operate said switch or to actuate said manual operator to feed wire-solder to said pointed soldering tip.

2. An electric soldering iron, as claimed in claim 1, in which the other of said gears is mounted on a second support shaft movable toward and away from said first mentioned support shaft; and biasing means associated with said second support shaft to bias said other gear toward said one gear to grip wire-solder therebetween.

3. An electric soldering iron, as claimed in claim 1, in which said finger tip actuated manual operator is a disc secured to said support shaft and having its periphery projecting through a slot in said grip.

4. An electric soldering iron, as claimed in claim 3, in which the periphery of said disc is knurled.

5. An electric soldering iron, as claimed in claim 1, in which said electric motor is mounted in an upper part of said grip and the lower part of said grip is adapted to mount a coil of wire-solder; and a support extending from said grip, said electrically energized heating means comprising a heater mounted in said support; said pointed soldering tip comprising a copper bar interchangeably secured in said heater; said wire guide means being supported from said support.

6. An electric soldering iron, as claimed in claim 1, in which said electric motor is mounted in the lower end of said grip; the upper end of said grip being adapted to mount a coil of wire-solder therein; said electrically energized means comprising a transformer mounted in said grip and a loop of electric resistance wire, forming said pointed soldering tip, and having a pointed bight and having its ends connected to the output terminals of said transformer.

7. An electric soldering iron, as claimed in claim 6, including a switch controlling connection of said transformer to a source of electric potential; and an indicating lamp mounted in said grip and illuminated responsive to closure of said last-named switch.

8. An electric soldering iron, as claimed in claim 6, in which said wire guide means comprises an elongated guide extending upwardly and forwardly to adjacent said pointed bight.

* * * * *